(12) United States Patent
Rath et al.

(10) Patent No.: US 12,511,197 B2
(45) Date of Patent: Dec. 30, 2025

(54) EFFICIENT AUTO RETENTION LOCK (ARL) POLICY IMPLEMENTATION DURING BACKUP JOB INITIATION

(71) Applicant: Dell Products L.P., Round Rock, TX (US)

(72) Inventors: Jagannathdas Rath, Bangalore (IN); Srisailendra Yallapragada, Cupertino, CA (US)

(73) Assignee: Dell Products L.P., Round Rock, TX (US)

( * ) Notice: Subject to any disclaimer, the term of this patent is extended or adjusted under 35 U.S.C. 154(b) by 105 days.

(21) Appl. No.: 18/523,435

(22) Filed: Nov. 29, 2023

(65) Prior Publication Data

US 2025/0173222 A1 May 29, 2025

(51) Int. Cl.
*G06F 11/14* (2006.01)

(52) U.S. Cl.
CPC ...... *G06F 11/1451* (2013.01); *G06F 11/1453* (2013.01); *G06F 11/1464* (2013.01)

(58) Field of Classification Search
CPC ............. G06F 11/1451; G06F 11/1453; G06F 11/1458; G06F 11/1461; G06F 11/1464
See application file for complete search history.

(56) References Cited

U.S. PATENT DOCUMENTS

| | | | |
|---|---|---|---|
| 2017/0060897 A1* | 3/2017 | Madaan | G06F 16/125 |
| 2023/0103474 A1* | 4/2023 | Gunda | G06F 11/1448 |
| | | | 711/162 |
| 2023/0104891 A1* | 4/2023 | Gunda | G06F 11/1453 |
| | | | 711/162 |
| 2025/0138946 A1* | 5/2025 | Srinath | G06F 11/1469 |

* cited by examiner

Primary Examiner — Chae M Ko
(74) Attorney, Agent, or Firm — Staniford Tomita LLP

(57) ABSTRACT

A flexible retention lock system defines, as attributes, an automatic retention lock (ARL) period specifying an amount of time to lock the file, and a cooling (COP) period specifying an amount of time within the first ARL after which the file will be locked if no modifications are made to the file during the first COP. These attributes are assigned an ARL label ID. These attributes are then attached to the file using the ARL label ID and are stored with the file metadata upon creation of the file, with the ARL label stored in a label database for convenient lookup. The backup application attaches the ID to a protection policy during creation of the protection policy, and sends the ID during a backup session to automatically set a lock on the files, where the lock conforms to the ARL period and COP period.

20 Claims, 7 Drawing Sheets

500

```
┌─────────────────────────────────────────────────────────────┐
│ Backup Application starts a backup job by initiating a      │
│ backup session with the backup server                       │
│ 502                                                         │
└─────────────────────────────────────────────────────────────┘
                              │
                              ▼
┌─────────────────────────────────────────────────────────────┐
│ Backup Application fetches configured ARL label ID from     │
│ protection policy and send it as part of the session        │
│ initiation operation                                        │
│ 506                                                         │
└─────────────────────────────────────────────────────────────┘
                              │
                              ▼
┌─────────────────────────────────────────────────────────────┐
│ Send ARL label ID to backup server as part of session       │
│ initiation                                                  │
│ 508                                                         │
└─────────────────────────────────────────────────────────────┘
                              │
                              ▼
┌─────────────────────────────────────────────────────────────┐
│ Backup server stores ARL label ID as in-memory session data │
│ 510                                                         │
└─────────────────────────────────────────────────────────────┘
                              │
                              ▼
┌─────────────────────────────────────────────────────────────┐
│ Ingest data for the backup job                              │
│ 511                                                         │
└─────────────────────────────────────────────────────────────┘
                              │
                              ▼
┌─────────────────────────────────────────────────────────────┐
│ Fetch the ARL label ID for a file ingested in the session   │
│ 512                                                         │
└─────────────────────────────────────────────────────────────┘
                              │
                              ▼
┌─────────────────────────────────────────────────────────────┐
│ Look up ARL label ID in the label database and fetch ARL    │
│ attributes and copy to the file (or store as part of        │
│ metadata) for metadata stored or looked-up ARL              │
│ 514                                                         │
└─────────────────────────────────────────────────────────────┘
                              │
                              ▼
┌─────────────────────────────────────────────────────────────┐
│ Backup App closes session with Server once all files are    │
│ ingested                                                    │
│ 516                                                         │
└─────────────────────────────────────────────────────────────┘
```

FIG. 5

EFFICIENT AUTO RETENTION LOCK (ARL) POLICY IMPLEMENTATION DURING BACKUP JOB INITIATION

TECHNICAL FIELD

This invention relates generally to data protection systems, and more particularly to providing efficient automatic retention lock policies during backup job initiation.

BACKGROUND OF THE INVENTION

Long term retention of data for regulatory compliance, organizational governance needs, or any similar reason requires data to be locked for a certain duration after it is ingested/written. Retention locking is often used to store this data in an immutable, indelible form for the prescribed duration, which can be anywhere from a few days or few weeks to several years or decades. After the retention duration expires, the backup applications cleanup the backups and delete the expired files on the backup server.

Two common ways to lock files are manual locking, which is performed explicitly by a user calling a retention lock API, or automatic retention locking (ARL), which is performed by the system automatically upon completion of data ingestion. Certain problems are associated with automatic retention locking (ARL). One such problem is that ARL is restricted to having only one default lock or ARL period for a filesystem or directory tree. Certain ARL methods may apply retention lock settings and instructions for each file in a backup job. Such methods typically require metadata to be defined and processed for each file as it is ingested by the backup server. This can lead to inefficiency as the same ARL settings may be used for many files processed by the backup server for a backup job.

What is needed, therefore, is a system method to efficiently define and apply retention lock settings for files on a backup job basis rather than a per-file basis.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, Data Domain Boost, and Power Protect are trademarks of Dell Technologies, Inc.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 5 is a flowchart that illustrates a method of ARL label IDs during data ingest by a backup application, under some embodiments.

DETAILED DESCRIPTION

Figure 1:
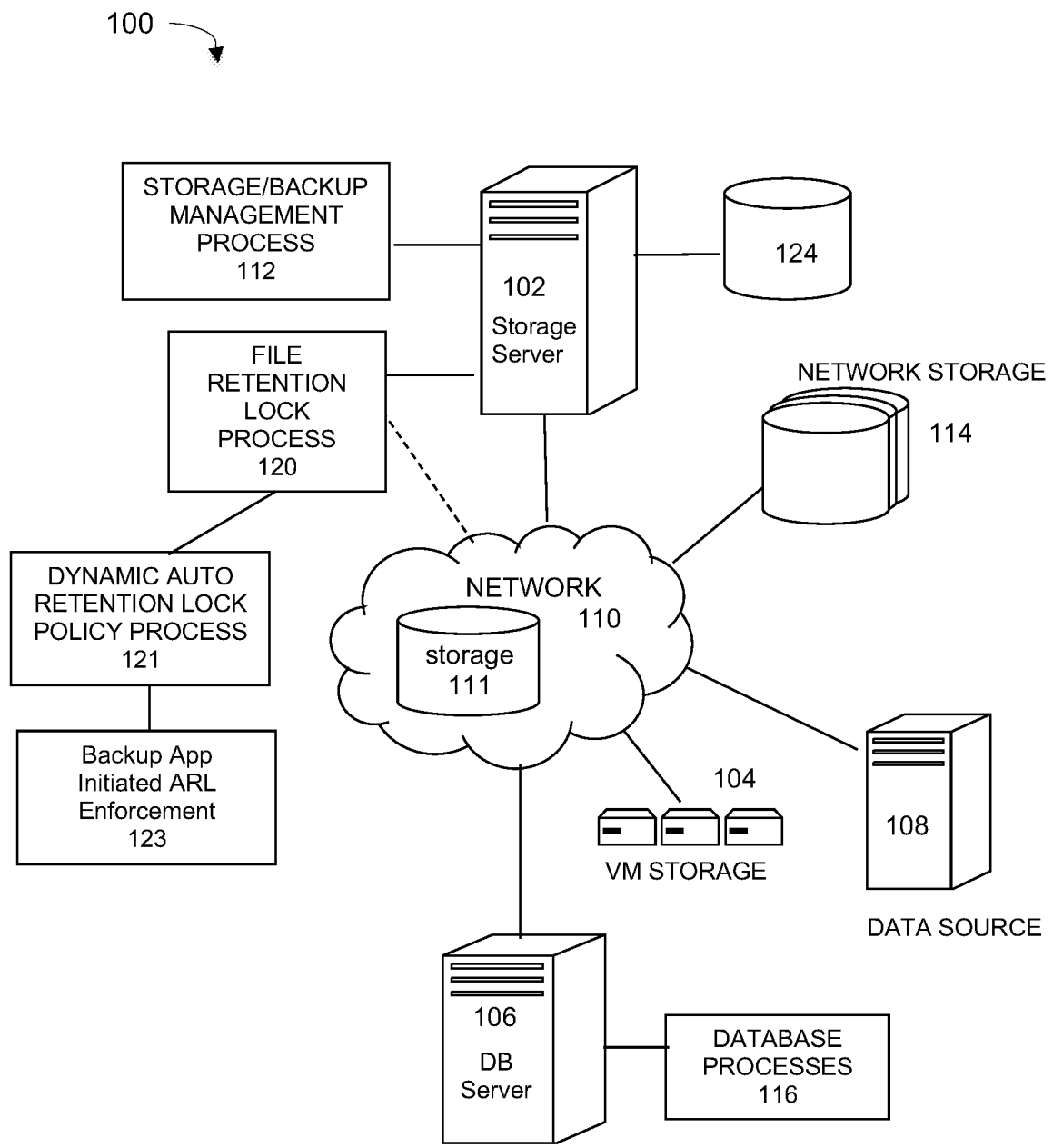
FIG. 1 is a diagram of a data protection network implementing flexible and dynamic auto retention lock (ARL) policies for large dataset storage, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software development and deployment in a distributed system, such as a cloud based network system or very large-scale wide area network (WAN), metropolitan area network (MAN), however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a system and method for providing flexible and dynamic automatic retention lock policies for backup dataset, and FIG. 1 illustrates a computer network system that implements one or more embodiments of such a system. In system 100, a storage server 102 executes a data storage or backup management process 112 that coordinates or manages the backup of data from one or more data sources 104, 106, or 108 to storage devices, such as local storage in 102 itself, network storage 114, or possible cloud storage 111 in network 110. The backup server 102 hosts the backup application to manage and trigger backup jobs. These backup jobs will backup data (VMs, databases, files, etc.) from the data sources (like VMs, Databases, files etc.) to the backup/storage server.

With regard to virtual storage 104, any number of virtual machines (VMs) or groups of VMs (e.g., organized into virtual centers) may be provided to serve as backup sources. The data sourced by the data source may be any appropriate data, such as database data that is part of a database management system, and the data may reside on one or more hard drives for the database(s) in a variety of formats. Thus, a data source may be a database server 106 executing one or more database processes 116, or it may be any other sources of data 108 for use by the resources of system 100.

The network server computers are coupled directly or indirectly to the data storage 114, VMs 104, and the data sources and other resources through network 110, which is typically a LAN, WAN or other appropriate network like a cloud network. Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform. In an embodiment, network 110 may be a private network or it may be a public network provided by a third-party cloud service provider (CSP).

The data generated or sourced by system 100 and transmitted over network 110 may be stored in any number of persistent storage locations and devices. In a backup case, the backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, system 100 may represent a Power Protect Data Domain Restorer (DDR)-based deduplication storage system, and storage server 102 may be implemented as a DDR Deduplication Storage server provided by Dell. However, other similar backup and storage systems are also possible.

In an embodiment, the storage (or backup) server 102 applies one or more backup policies (e.g., conforming to application rules or governance/compliance rules) for storing the data. The deduplication backup system 112 deduplicates the data according to its processes and then sends this data to storage media, also referred to as a 'storage target', which may be local storage 124, network storage 114, or any other storage of any appropriate media (e.g., disk, tape, solid state memory, etc.). For full or partial cloud-based networks, the backup data can also, or instead be sent to cloud storage 111 in network 110 after local storage in the backup system.

After the data is received in the backup system and data ingest is complete, the backup application 112 issues lock requests through process 120 to set the lock for the newly written files. Files are thus generally retention locked after they are written to the storage media or cloud storage. The retention lock can be applied to any appropriate data object or element (e.g., directory, file, filesystem, etc.) as it is written and stored in the storage media. For the embodiment of FIG. 1, the lock is applied automatically by process 121 using certain defined automatic retention lock attributes that are associated with or encoded in the file to be retained and locked.

It should be noted that the data backup system of FIG. 1 is provided for purposes of illustration, and retention lock process 121 can be used with any appropriate deduplicated backup system (other than Power Protect Data Domain), and other or alternative retention policies, rules, and standards. Furthermore, although embodiments are described with relation to retention locking for certain reasons, such as regulatory compliance, embodiments are not so limited and files may be retention locked for a variety of other reasons as well.

As shown in FIG. 1, system 100 includes file retention lock process 120 that locks selected files against modification or deletion to protect these files from unintended or unwanted changes, or malicious tampering. In present systems, retention locking is typically enabled by user or administrator command at time of file creation or modification to lock the file for a certain period of time, which may be extended or reverted by the user, as per allowed policies. Retention locking may also be implemented automatically by the storage server 102 as part of backup management process 112, or it may be executed by a cloud or network 110 resource, such as if a set of files is governed by a policy that automatically locks the files.

The two common ways used to lock the data are thus manual locking and automatic locking. For manual locking, the lock operation is performed on the file explicitly by executing a command or calling a retention lock API provided by the backup server or cloud storage REST API. This is done either manually by the user/admin or by the backup application after the data is ingested. For example, updating the "Last access time" of a file can trigger a lock operation in some backup servers. In one example, a PowerProtect Data Domain system, the Power Protect DDBoost client software provides explicit retention lock APIs that can be triggered by any application to lock individual files. In another example, AWS S3 REST APIs can be instructed to lock a file by adding certain HTTP Headers. Other manual retention lock mechanisms are also commonly available.

For automatic retention locking (ARL) or default locking, there is no deliberate or manual lock operation executed by users or applications (no APIs invoked to lock a file). The files are locked automatically for a predefined duration once the file or backup data is ingested by the backup server. The predefined duration is generally known as Auto Lock Period or Default Lock Period. In this mode, the backups server or cloud storage software is responsible to ensure that the dataset (file or directory, etc.) gets locked automatically. Many backup servers provide a cooling period buffer before the file gets locked automatically, where the cooling period (COP) is the amount of time after which a file gets auto-locked if it is not modified within that time. For example, a COP of 2 hours would mean that file would get auto locked if it is not modified within 2 hours. If it is modified during this time, the COP period restarts.

As mentioned above, one issue with ARL is the restriction of having only one default lock or ARL period for the whole directory or cloud storage bucket. That is, if the ARL period is set to 6 months, for example, then all files would be locked for 6 months only. In such a system, it is generally not possible to specify different ARL periods for different sets/groups of files under the same directory, filesystem share, or bucket, etc. To get around this limitation, some users resort to creating multiple directories, filesystem shares, mounts, or cloud buckets etc., each with different ARL periods. As can appreciated, however, this approach is simply not feasible beyond a certain point, and also imposes a large management overhead. In extreme instances, users may resort to not using ARL, and fall back to the manual locking of each file with different durations as needed. In this case, the whole flexibility of auto-locking is lost, and clients need to call additional lock API for each file in the backup server.

A second major issue with ARL is extending lock durations of already locked files. Extending retention locks is an important and common procedure given that backup policies, data classifications, and so on, may change over the course of an originally set lock duration period. A traditional lock extension method works by iterating the filesystem and extending the locks at individual file level, one at a time. This filesystem iteration and lock extension operation together are time and resource consuming operations, and can greatly impact the performance of the backup server until the process completes, which can take many hours or days if there are significantly large number of files.

Modifying the configured ARL duration in present ARL methods may impact only the future new files or all existing files as well as future new files. However, this option depends on how it is implemented. One negative side effect of this is that locks are extended for all unwanted files as well as intended files, leading to capacity lockout, unnecessary cloud costs, and so on. Another side-effect is that all of the new files are now locked for a greater duration even if it was never the requirement. This problem just increases as more extensions are attempted.

To overcome these issues, embodiments of the dynamic ARL policy process 121 includes an efficient method to dynamically define and manage different ARL periods and lock extensions on the same file. It should be noted that the dynamic ARL process 121 can be configured on any directory, filesystem share, cloud storage bucket, container, or any other kind of storage volume or device, and described embodiments are equally applicable to any kind of storage unit type. For simplicity, embodiments will only refer to a directory structure, but embodiments are not so limited, as just mentioned.

In an embodiment, this directory structure may comprise an MTree, where system 100 is a Power Protect Data Domain deduplication backup system, and a Power Protect Data Domain Managed Tree (MTree) is a user-defined logical partition of the Power Protect Data Domain file system that enables granular management of a data in Data Domain system. In an embodiment, retention lock software 120 can be enabled at an individual MTree level. In general, once a backup file has been migrated onto a Data Domain system, it is the responsibility of the backup application to set and communicate the retention period attribute to the Data Domain system.

In an embodiment, process 121 provides dynamic ARL management in which backup applications or users can define multiple "ARL labels", each having different values, such as retention lock period and COP, but applied on different sets or groups of files on the same MTree. This gives the backup applications a much fine-grained control for ARL without any kind of additional management overhead. The ARL labels are stored in a label database and a stored ARL label then be applied to many different files, with one label per file. When a protection policy is created in the backup application, a user can select one existing ARL label ID as per applicable retention requirements. Once the label is selected and the protection policy is created, the ARL label ID becomes part of the protection policy information. For every file ingested in a backup job, the backup application attaches this ARL label ID to indicate the retention requirements for the file.

For this embodiment, an ARL label comprises a data element, such as text string, table, or similar data element, that encodes a definition that includes: (i) ID: a unique identifier among all the labels in the system, (ii) ARL period: the amount of time a file will be locked automatically, and (iii) cooling period (COP): the amount of time after which the file will be locked if no modifications happen in that time. One example of an ARL label might be: {ShortTermLocks, 7days, 2hours}, which means that the default lock duration is 7 days and the cooling period is 2 hours, for an ID of "ShortTermLocks." A second example might be: {CriticalLocks, 3months, 10minutes}, which means that the default lock duration is 3 months and the cooling period is 10 mins for lock ID CriticalLocks.

As shown in this example, the ARL label generally describes the type of lock for which the attributes are used, such a critical lock, a short-term lock, and so on. Any appropriate lock type may be labeled accordingly based on file type, data type, or other characteristics.

Metadata-Stored ARL

Figure 2A:
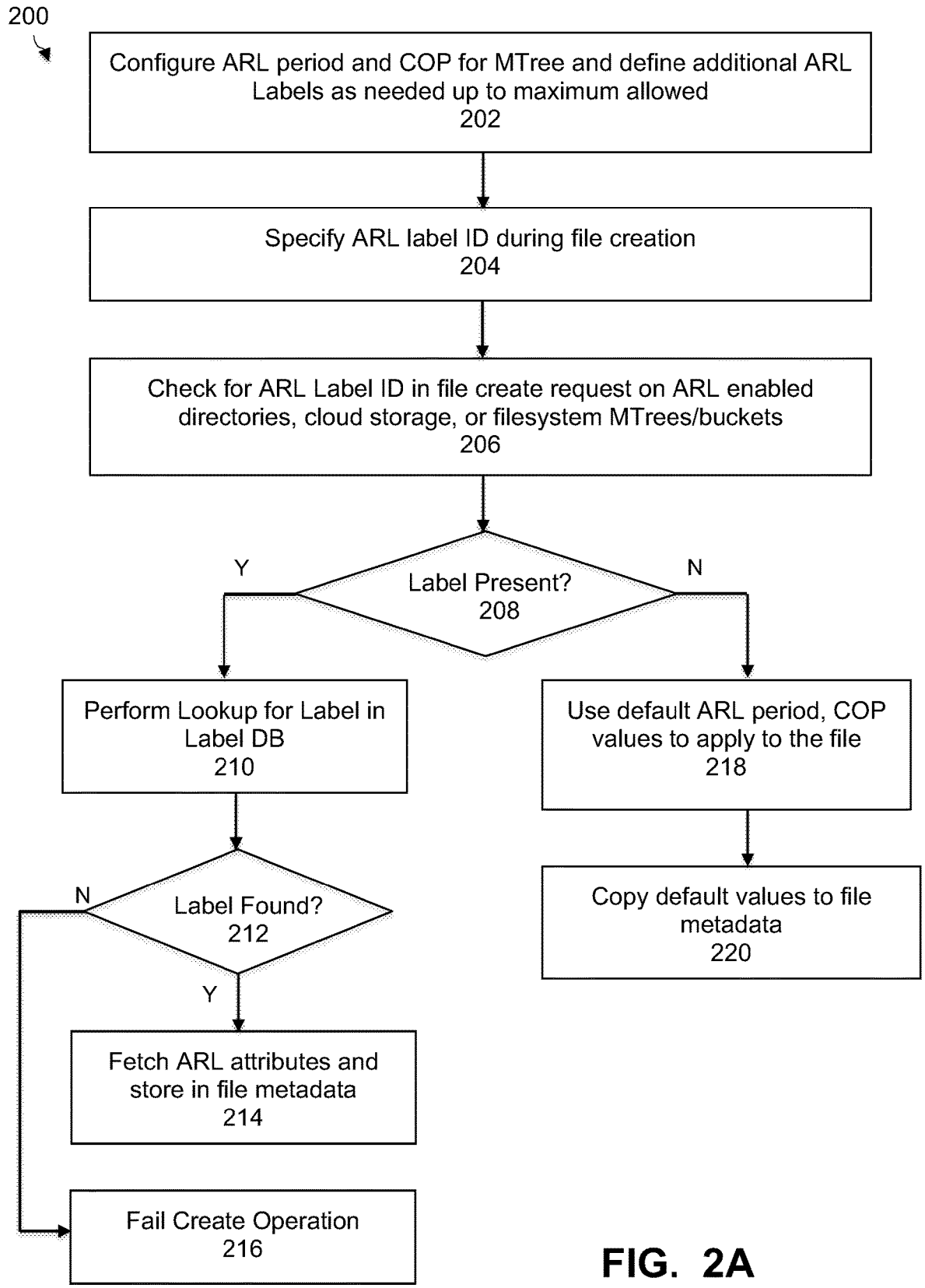
FIG. 2A is a flowchart illustrating a method for implementing dynamic ARL management using ARL labels, under a first embodiment.

FIG. 2A is a flowchart illustrating a method 200 for implementing dynamic ARL management using ARL labels, under some embodiments. In some current systems, to enable ARL on a MTree, a user may already configure the default ARL period and COP (if supported). Process 200 allows users to create additional ARL labels with different (ARL period, COP) values, which can be later attached to files, step 202. All of the labels are managed in-memory and also stored in a persistent database. There can be a configurable maximum limit on the number of labels that can be created in the system or for each MTree. Any practical number can be used, and an example default could be maximum of 64 labels.

Figure 2B:
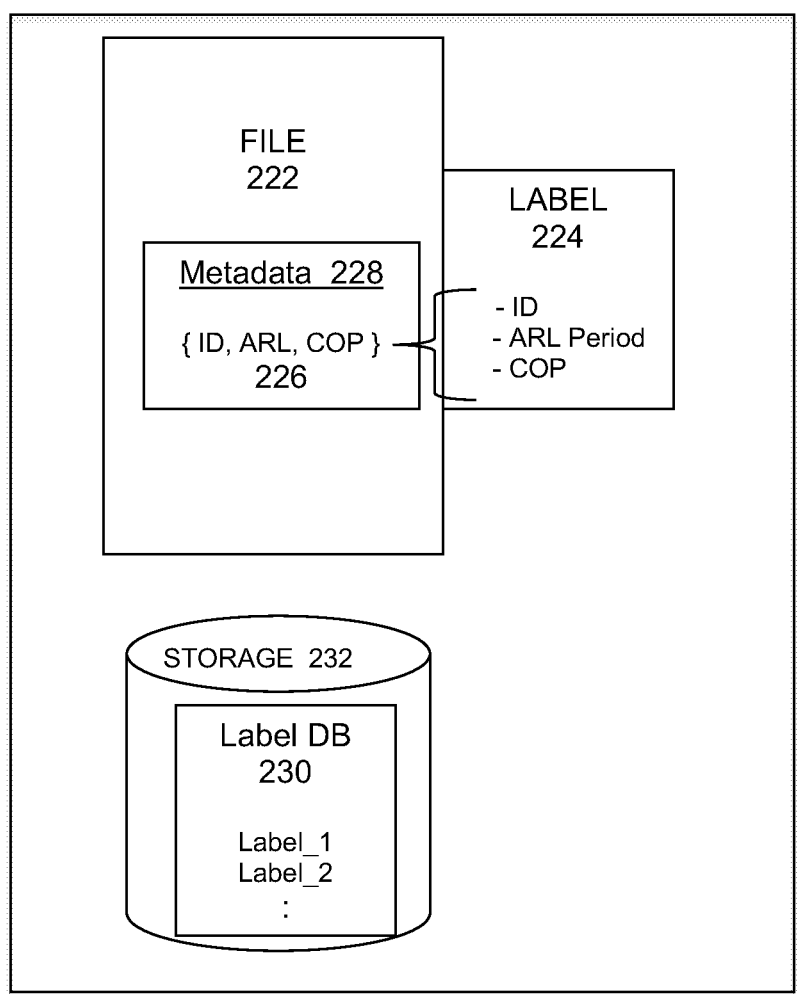
FIG. 2B illustrates an ARL label attached to a file for the embodiment of FIG. 2A.

FIG. 2B. illustrates an ARL label attached to a file 222, in an example embodiment corresponding to process 200 of FIG. 2A. Each file has a single label, and as shown in FIG. 2B, file 222 has a label 224. This label contains the necessary ID, ARL period, and COP values for the file, which may be encapsulated as text string or data element 306 and encoded in the file 222 itself. The data element 226 for the attached label may then take the form of a string of label data or a flat table, or other similar data element, and is stored as part of the file metadata 228. As shown in FIG. 2B, the system simply looks up labels in the label database 230.

The file 222 may be stored in the storage target in an MTree directory, or any other similar filesystem directory.

As shown in FIG. 2A, the ARL label ID (e.g., "LOCK_CRITICAL") is specified during file creation, 204. The label IDs are stored in a label database 230 that is typically stored locally in the server, such as in storage 232. Most backup applications use the backup server's client software and its APIs to interact with the backup servers (e.g., Power Protect DDBoost in PowerProtect DD systems). Process 200 enhances the client software to allow users and applications to specify an "ARL Label ID" in the API calls when ingesting new files. Similarly, for cloud storage operations, the label ID can be specified via a specific HTTP header in the PUT or POST request (e.g., x-amz-arl-label-id: "ARL_LOCK_CRITICAL"). In this embodiment, the cloud storage software is configured to detect the presence of this header and act accordingly.

As shown in FIG. 2A, step 206, when the backup server receives a file create request on ARL enabled directories, cloud storage or filesystem MTrees/buckets, etc., the method will first check for the presence of any ARL label ID in the request.

If the label is present, as determined in 208, the process will perform a lookup for the given label ID in the in-memory copy of the label database, 210. If it finds it in the lookup in step 212, it will then fetch the ARL attributes of the label and store the ARL period and cooling period values in the file metadata, 214, as shown in the example of FIG. 2B. If the label is not found, such as due to a wrong or bad label ID sent by the client software, then the backup server will fail the create operation, 216.

If, in step 208, it is determined that no ARL label ID is found in the file create request, then the default ARL attributes configured for the MTree/bucket (i.e., default ARL period, COP) will be used to apply the automatic retention lock on the file, 218. These default values for ARL period and COP will then be copied to the file's metadata 308, step 220.

Through process 200, a file can be retention locked through an automatic process for a retention period subject to a cooling period as specified by a specific ARL attached to the file.

In certain cases, it may be necessary to validate the lock state of a file, such as for auditing purposes. For validating if a file is locked or not, component 121 fetches the ARL attributes (ARL period, COP) from the file metadata 228 and evaluates the lock state (i.e., lock or no_lock). For example, in a PowerProtect DD, for an ARL file, this might be expressed as:

If (LastModifiedTime of File+COP)>Current_time), then the file is still in cooling period.

If (LastModifiedTime of File+COP)<Current_time, then file is locked.

If (LastModifiedTime of File+ARL period)<Current_time), then the lock has already expired.

In another example, the system may use the CreationTime instead of LastModifiedTime to deduce if the file is locked or in a cooling period. Many filesystem operations like write( ), setattr( ), remove( ), rename( ) etc. check the lock state of a file before allowing or rejecting the operation.

In an embodiment, the ARL label attributes may be modified. For this type of operation, certain rules may be imposed by process 121. For example, the ARL period of a label can only be increased (within the system allowed limit) and never decreased, but the cooling period value of a label can be both increased and decreased within the allowed limits. Any modification of an ARL attribute value for a label would come into effect only for future new files that are going to be ingested. Modifying a label's attributes may require multi-level authorizations, e.g., admin and security officer credentials, multi-factor authorization, etc., and the new values would be synced to disk immediately. Other or additional similar rules may also be defined and required by the system 100.

In some cases, it may be necessary to revert the lock on a file, that is, to unlock a previously or automatically locked file. For process 121, reverting a lock on a file is an allowed operation for non-compliance retention lock implementations, like governance mode or unlocked mode of retention locks in cloud storage. The revert operation in this method has no change and will continue to clear all of the ARL attributes from the file metadata, including ARL label ID, if stored.

As shown in FIG. 2B, the system maintains a persistent Label DB 230 kept in in-memory storage 232. This database list can be stored as part of the MTree metadata or filesystem metadata. Alternatively, it can be a stored in a simple database on media such as SSD/NVME, where synchronous updates are fast. This takes advantage of the fact that many backup servers today utilize SSDs/NVMEs for storing the filesystem metadata, and so on. The labels can also be persisted in any other form that the backup server already supports and ensures integrity and consistency. Labels stored in database 230 can be deleted at any point of time. This will not impact any of the locked files or files in a cooling period. If the same label ID is referenced by an application after it is deleted, then those file creates will fail.

In a process using the label mechanism of FIG. 2B, the system defines ARL and COP periods, associates the ARL period and COP period as attributes to a unique ARL label identifying the ARL policy, stores the ARL label in a label database, and attaches the ARL label to one or more files to automatically set a lock on the file corresponding to the ARL period and COP period. In this way, a single label can be applied to any number of files to quickly and conveniently define the ARL and COP periods for those files.

As described, the dynamic ARL process 121 provides a fine-grained control in defining different ARL attributes for different sets of files or different backup policy levels. It ensures that no new MTree or filesystem share or S3 bucket needs to be created to support different sets of ARL attributes. The process applies equally on backup servers as well as cloud storage providing default and automatic retention locking capabilities to users, thus eliminating the need for manual locking.

The file retention lock process includes software that allows a user to set the lock on a file to prevent deletion or modification of a file for a set number of years (e.g., such as up to 70 years). This lock is automatically set after the specified cooling period and for the amount of time specified by the ARL period, during which no one is able to modify or delete the file. A number of different ARL and associated COP periods may be defined for each file to provide flexibility and greater granular control over the retention lock for each file.

ARL Lookup

For the embodiment described above with respect to FIGS. 2A and 2B, component 121 fetches the ARL attributes (ARL period, COP) from the file metadata 228 and any modification of an ARL attribute value for a label takes effect only for future new files that are going to be ingested. In an alternative embodiment, component 121 will fetch the ARL label ID and COP from the file metadata and then lookup the ARL label ID and fetch the ARL period for the state check. For this embodiment, the ARL label will comprise the ARL Label ID, ARL_Period, and COP, and any change to ARL COP will come into effect for new files, but any change to ARL period will impact all existing locked files as well as new files.

Figure 3A:
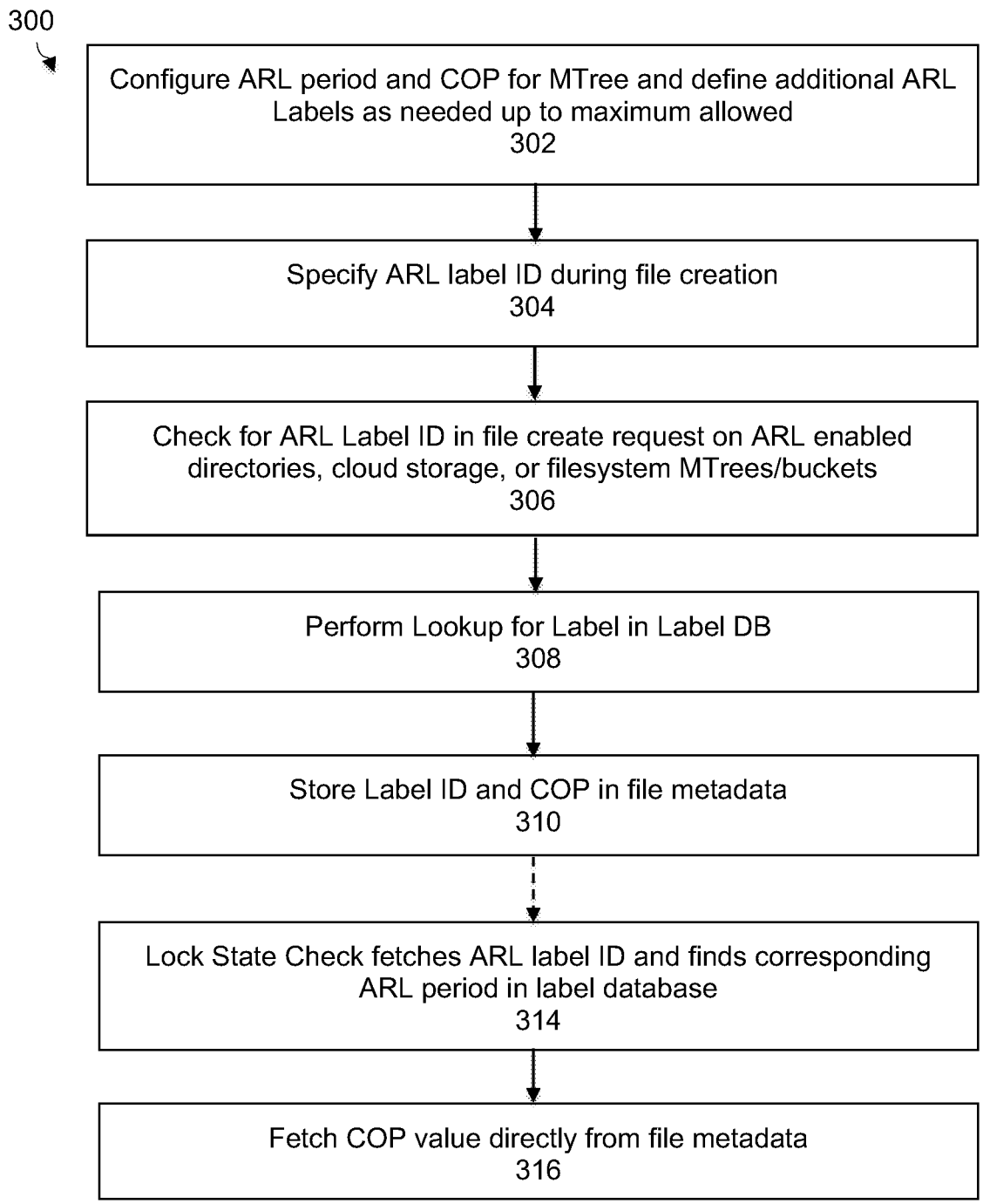
FIG. 3A is a flowchart illustrating a method for implementing dynamic ARL management using ARL labels, under a second embodiment.

FIG. 3A is a flowchart illustrating a method 300 for implementing dynamic ARL management using ARL labels, under this alternative embodiment. In some current systems, to enable ARL on a MTree, a user may already configure the default ARL period and COP (if supported). Process 300 allows users to create additional ARL labels with different (ARL period, COP) values, which can be later attached to files, step 302. All of the labels are managed in-memory and also stored in a persistent database. There can be a configurable maximum limit on the number of labels that can be created in the system or for each MTree. Any practical number can be used, and an example default could be maximum of 64 labels.

Figure 3B:
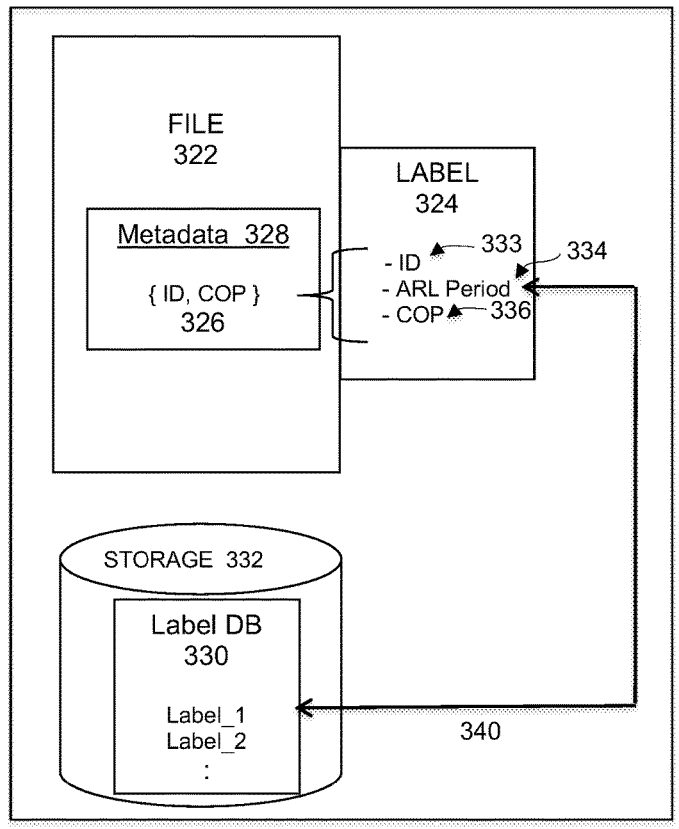
FIG. 3B illustrates an ARL label attached to a file 302, for the embodiment of FIG. 3A.

FIG. 3B illustrates an ARL label attached to a file 322, for the embodiment of FIG. 3A. Each file has a single label, and as shown in FIG. 3B, file 322 has a label 324 comprising the ID 333, ARL period 334, and COP 336. A portion of the label is copied to and stored as metadata 308 attached to the file 302. In an embodiment, the metadata portion 306 includes the label ID and COP value only, and the ARL period is not copied to the metadata.

In general, the label 324 may be encapsulated as a text string or other data element, while the metadata portion (ID, COP) 328 is formatted in any appropriate metadata format for incorporation into the file 322 itself. The entire label 324 may thus comprise data in the form of a string of label data or a flat table, or other similar data element, and is stored as part of or associated with the file 322. As shown in FIG. 3B, the system looks up labels in the label database 330. The file 322 itself may be stored in the storage target in an MTree directory, or any other similar filesystem directory.

As shown in FIG. 3A, the ARL label ID (e.g., "LOCK_CRITICAL") is specified during file creation, 304. The label IDs are stored in a label database 330 that is typically stored locally in the server, such as in storage 332. Most backup applications use the backup server's client software and its APIs to interact with the backup servers (e.g., Power Protect DDBoost in PowerProtect DD systems). Process 300 enhances the client software to allow users and applications to specify an "ARL Label ID" in the API calls when ingesting new files. Similarly, for cloud storage operations, the label ID can be specified via a specific HTTP header in the PUT or POST request (e.g., x-amz-arl-label-id: "ARL_LOCK_CRITICAL"). In this embodiment, the cloud storage software is configured to detect the presence of this header and act accordingly.

As shown in FIG. 3A, step 306, when the backup server receives a file create request on ARL enabled directories, cloud storage or filesystem MTrees/buckets, etc., the method will first check for the presence of any ARL label ID in the request.

Label IDs are sent in a file create request, and upon finding a label ID in the request, the system will perform a lookup of the label contents for the given label ID, 308. As shown in FIG. 3B, the label 324 comprises the ID, ARL period, and COP values. The system then stores the label ID 333 and COP 336 values in the file's metadata 328, step 310. The COP value is stored in metadata to prevent the impact of any future modifications to the COP in the label that may change the lock state back to unlocked.

A lock state check routine will fetch the ARL label ID from the file's metadata and uses it to lookup the label in the label database to obtain the ARL period from the database for the identified label, 314. The system will then fetch the COP value directly from file metadata as it was copied during the file create phase, 316.

Any change to the ARL period for a given label ID will also automatically reflect for all existing files as well as new ones, as they all refer to the values from the label DB itself, and any change to COP value for a label ID will reflect only in new files (as COP values are copied to the file metadata), 328. For example, to extend the locks on already locked files, the system simply needs to update the corresponding ARL label's attributes (i.e. ARL period and COP values) as needed, and this will reflect automatically in all of the existing and new files. This process thus utilizes the ARL label framework and uses it to provide instant lock extension for millions of files.

It should be noted that although certain process steps of FIG. 2A and 3A are shown in a sequential order, certain steps may occur out of the illustrated sequence or concurrently with other steps. For example, the lock state check 314 may be performed independently of the other steps.

Through process 300, a file can be retention locked through an automatic process for a retention period subject to a cooling period as specified by a specific ARL attached to the file, and any changes (extension) of the lock period will be automatically instituted in new and existing files through the use of a label database-stored ARL period and metadata-stored COP value.

In a process using the label mechanism of FIG. 3B, the system defines ARL and COP periods, associates the ARL period and COP period as attributes to a unique ARL label identifying the ARL policy, stores the ARL label in a label database, and attaches the ARL label to one or more files to automatically set a lock on the file corresponding to the ARL period and COP period. In this way, a single label can be applied to any number of files to quickly and conveniently define the ARL and COP periods for those files.

ARL Policy Enactment During Backup Job Initiation

Figure 4:
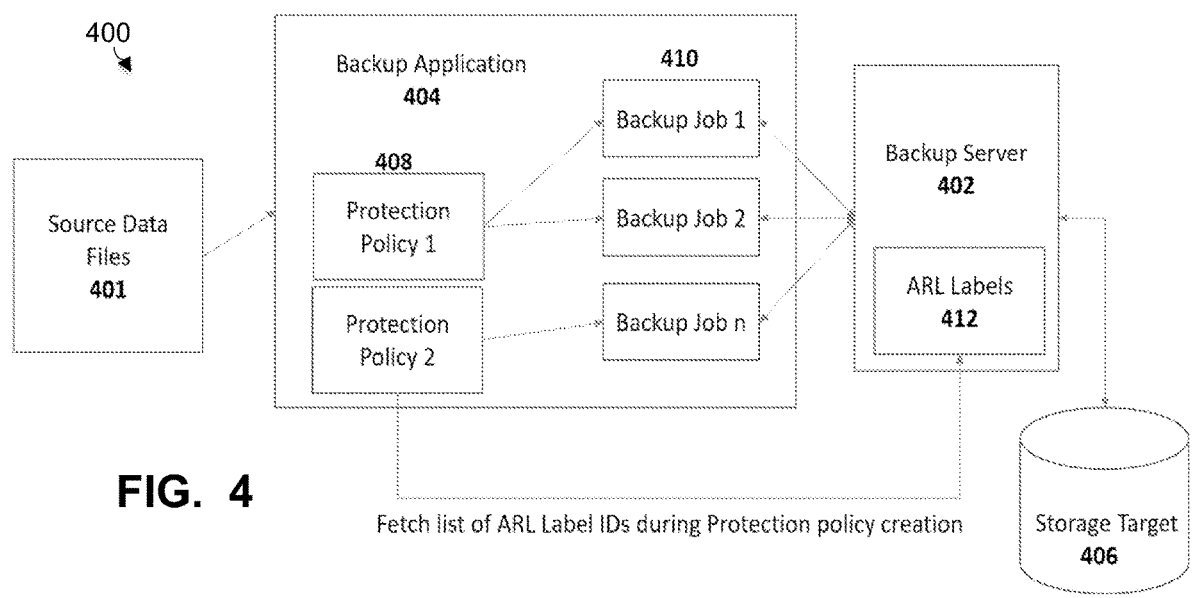
FIG. 4 is a diagram that illustrates the use of ARL labels through a backup application to implement protection policies specifying retention lock periods for different backup jobs, under some embodiments.

For the embodiments described above, users can create ARL label IDs in the backup server, and in backup applications, an ARL label ID can be assigned to a protection policy to indicate the retention needs. The backup application sends the ARL label ID from the protection policy as part of file ingest for a backup job, and the backup server would detect the ARL Label ID in the ingest operation and would fetch the ARL attributes from the label database and apply it on the new file to auto lock it for the ARL period (lock duration) set in the label. In this case, the backup server can either copy the ARL attributes to the file metadata itself, or it can store the ARL label ID itself in the file metadata and then later operations can deduce the ARL attributes from that ID and label database. This process requires the backup job to set the ARL label ID for each file in each backup job. The ARL label can be metadata-stored as shown in FIG. 2B or looked up as shown in FIG. 3B As shown in FIG. 1, system 100 includes a processing component that allows the backup application to set the ARL label ID only once for each backup job and transmit that information to the backup server, in the backup initiation session with the server, to enforce it automatically on each file being ingested in a backup job. Here, the backup initiation session is the initial handshake process to create a backup session between then backup application and the backup server when a backup job is started. By attaching an ARL label ID in this backup initiation session itself, backup applications no longer have to attach the ARL label ID (whether fetched from metadata or by lookup) to each file under the backup job, FIG. 4 is a diagram 400 that illustrates the use of ARL labels through a backup application to implement protection policies specifying retention lock periods for different backup jobs, under some embodiments. As shown in FIG. 4, a backup server 402 hosts or includes a backup application 404 that backs up source data files 401 for storage in storage target 406. The backup application 404 may use one or more protection policies 408 that specify certain parameters such as backup period, retention locks, target identifiers, backup type, restrictions, and so on. These protection policies are applied as needed to the various backup jobs 410 that are spawned by the backup application 404. As described above, ARL labels 412 stored in a label database and indexed using unique IDs specify certain lock (ARL) and cooling off (COP) periods. For the embodiment of FIG. 4, these ARL labels 412 are set once in the protection policy, when the policy is created. The backup application can query the backup server to get a list of available ARL label IDs and user can choose one from it for the new policy being created. It can also be that a new ARL label ID can be created directly in the policy creation workflow itself as well. The relevant ARL and COP periods are then applied at once for all of the backup jobs 410 spawned by the backup application 404, for a particular protection policy 408.

FIG. 5 is a flowchart that illustrates a method of ARL label IDs during data ingest by a backup application, under some embodiments. Process 500 starts with the backup application starting a scheduled or manual backup job, 502. In this step, it first initiates a session with the backup server, such as via the backup server's client software (e.g., Power Protect DDBoost).

First, the backup application will fetch the configured ARL label ID from the protection policy information and then send it as part of the session initiation operation itself, 506.

In step 508, the ARL label ID is sent to the backup server as part of session initiation operation. The backup server will then store the ARL label ID as part of the session information, 510. This can be stored in the in-memory session data structures or any similar data structures related to the backup session. The session will remain open until the backup application ingests all the files for that backup job and closes the session. This adds intelligence that improves upon traditional methods in which the ARL label ID arrives with the file create request.

After step 510, the data ingest process for each file then starts, 511. The data ingest will thus start with the fetching of an ARL label ID from the protection policy, sending it in backup session initiation and the backup server storing it in-memory session data. In the backup server, whenever a file is ingested under this session, the create( ) operation in backup server will fetch the ARL label ID from the session information itself, 512. The backup server will then proceed to look up the ARL label ID in the label database and fetch the ARL attributes and copy to the file, 514. Alternatively, it can look up the ARL label ID and if its valid, it will store the ID as part of file metadata, as described below.

Once all the files are ingested, backup application closes the session with the backup server, 516.

As illustrated with respect to step 514, the backup server looks up the ARL label ID, fetches the ARL attributes and copies them to the file, 514, or, it can look up the ARL label ID and if it is valid, it will store the ID as part of file metadata. For this step 514, the ID, ARL period and COP may all be stored in metadata, as shown in step 2B, or only the ID and COP may be stored with the ARL looked up separately.

As shown for the embodiment of FIG. 2B, the label 224 comprises the ID, ARL period, and COP values. The system stores the label ID, ARL, and COP values 226 in the file's metadata 228. A lock state check routine will fetch the ARL label ID from the file's metadata and will then fetch the ARL and COP values directly from file metadata as it was copied during the file create phase. In some embodiments, the ARL period may not be stored in metadata, as shown, but instead is stored only in the ARL label database. In this case, the label ID in the metadata is used to lookup the label in the label database to obtain the ARL period from the database for the identified label, such as shown for the embodiment of FIG. 3B.

In general, process 500 is essentially executed for every backup job 410, so that the backup application 404 would initiate a session with the backup server 402 and send the ARL label ID 412 as configured in the corresponding protection policy 408 of that backup job. This method removes the need for a backup application to specify the ARL label ID for every file ingest under a backup job. The backup application 404 only needs to send the ARL label ID as part of session initiation operation and the backup server 402 enforces it on every file 401 that gets ingested via that session. As can be seen, this method 500 takes the ARL locking mechanism one step closer to being completely 'storage controlled.'

Although embodiments are illustrated and described with respect to a Power Protect Data Domain system, which is a purpose-built backup appliance providing streaming deduplication, it should be noted that embodiments are not so limited and any other deduplication backup system may be used. Similarly, network 110 if cloud-based may integrate with an Dell ECS (or similar) system embodied as a public cloud or hosted private cloud to provide a scalable storage architecture. The system 100 may thus be implemented as an ECS-based object storage platform designed around use cases of an ever expanding cloud enabled data center. Object containers that can be created as an endless pool and scaled out across an expandable pool of storage nodes, and data may be stored as objects and accessed through API calls across multiple protocols including S3, Swift, and NFS among others. Embodiments are not so limited however, and other similar cloud-based storage systems may be used.

Embodiments of the processes and techniques described above can be implemented on any appropriate backup system operating environment or file system, or network server system. Such embodiments may include other or alternative data structures or definitions as needed or appropriate.

Figure 6:
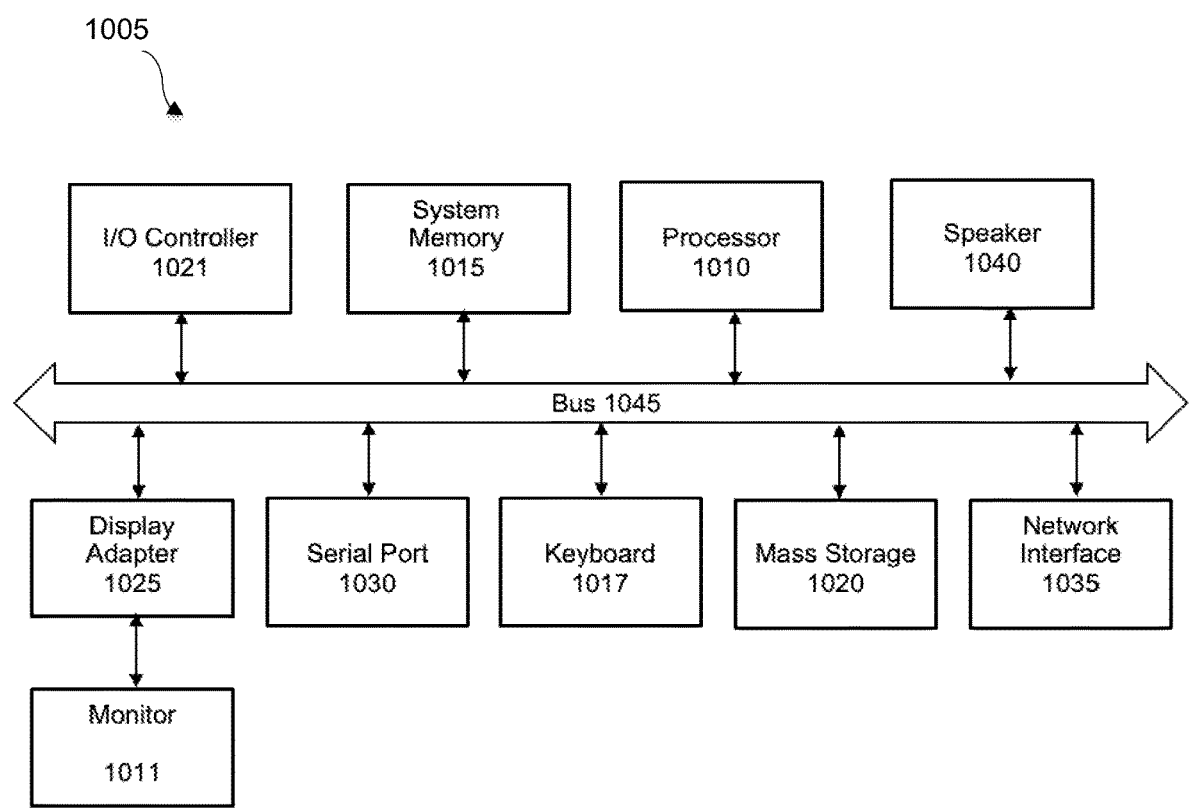
FIG. 6 is a system block diagram of a computer system used to execute one or more software components of system implementing one or more processes described herein, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 6 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is only one example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system 1005 may be one of the Microsoft Windows®. family of systems (e.g., Windows Server), Linux, Mac OS X, IRIX32, or IRIX64. Other operating systems may be used. Microsoft Windows is a trademark of Microsoft Corporation.

The computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.x), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method to automatically retention lock a file in a backup server executing a backup application, comprising:
   first defining an automatic retention lock (ARL) period specifying an amount of time to lock the file;
   second defining a cooling (COP) period specifying an amount of time within the ARL period after which the file will be locked if no modifications are made to the file during the COP;
   associating the ARL period and COP period as attributes to a unique ARL label ID identifying the ARL policy;
   storing the ARL label ID in a label database; and attaching, in backup application, the ARL label ID to a protection policy during creation of the protection policy; and sending, from the backup application, the ARL label ID during a backup session initiated by the backup server to automatically set a lock on all files processed by the backup session, wherein the lock conforms to the ARL period and COP period.

2. The method of claim 1 wherein each ARL label ID comprises a unique alphanumeric value to be used as a unique identifier for the attributes.

3. The method of claim 2 wherein the ARL label ID is provided in a backup session initiation phase performed before ingestion of files for a backup job.

4. The method of claim 1 wherein the ARL period, COP period, and ARL label ID are stored in metadata of a file referenced by an ARL label.

5. The method of claim 1 wherein only the COP period, and ARL label ID are stored in metadata of a file referenced by an ARL label, and the ARL period is looked up using the ARL label ID.

6. The method of claim 4 further comprising:
fetching, upon receipt of a request, the attributes and additional attributes; and
storing the corresponding ARL and COP periods for each of the attributes in metadata of the file.

7. The method of claim 5 further comprising:
fetching, upon receipt of a request, the attributes and additional attributes; and
storing the corresponding COP periods for each of the attributes in metadata of the file.

8. The method of claim 3 further comprising using system defined default ARL and COP periods in the event that ARL label ID is not provided in the backup session initiation phase.

9. The method of claim 1 further comprising defining a maximum number of additional ARL labels through one of user selection or system default value.

10. The method of claim 1, wherein the backup server comprises a Power Protect Data Domain File System deduplication backup system, and wherein the file is saved in a directory structure comprising an MTree, and further wherein the label database is stored in local storage of the backup system.

11. A computer-implemented method to automatically retention lock a file in a backup server executing a backup application, comprising:
defining, as attributes, a first automatic retention lock (ARL) period specifying an amount of time to lock the file, and a cooling (COP) period specifying an amount of time within the ARL period after which the file will be locked if no modifications are made to the file during the COP;
assigning an ARL label ID to the attributes;
storing the ARL label ID in a label database; and
attaching, in the backup application, an ARL label ID to a protection policy during creation of the protection policy; and
sending, from the backup application, the ARL label ID in a backup session initiated by the backup server to automatically set a lock on all files processed in the same backup session for a backup job, wherein the lock conforms to the ARL period and COP period.

12. The method of claim 11 wherein the backup server comprises a Power Protect Data Domain File System deduplication backup system, and wherein the file is saved in a directory structure comprising an MTree, and further wherein the label database is stored in local storage of the backup server.

13. The method of claim 11 wherein the ARL label ID comprises a unique alphanumeric value to be used as a unique identifier for the attributes.

14. The method of claim 13 wherein the ARL label ID is provided in a backup session initiation phase performed before ingestion of files for the backup job.

15. The method of claim 14 wherein the ARL period, COP period, and ARL label ID are stored in metadata of a file referenced by the ARL label, the method further comprising:
fetching, upon receipt of a request, the attributes and additional attributes; and
storing the corresponding ARL and COP periods for each of the attributes in metadata of the file.

16. The method of claim 14 wherein only the COP period, and ARL label ID are stored in metadata of a file referenced by the ARL label, and the ARL period is looked up using the ID, the method further comprising:
fetching, upon receipt of a request, the attributes and additional attributes; and
storing the corresponding COP periods for each of the attributes in metadata of the file.

17. The method of claim 16 further comprising using system defined default ARL and COP periods in the event that ARL label ID is not provided in a request to create the file.

18. The method of claim 11 further comprising defining a maximum number of additional ARL labels through one of user selection or system default value.

19. A system for automatically retention locking a file in a backup system having a backup server executing a backup application, comprising:
a first retention lock (ARL) component defining, as attributes, an automatic retention lock (ARL) period specifying an amount of time to lock the file, and a cooling (COP) period specifying an amount of time within the ARL period after which the file will be locked if no modifications are made to the file during the COP, and assigning a ARL label ID to the attributes;
a component attaching, in the backup application, an ARL label ID to a protection policy during creation of the protection policy;
a hardware-based storage medium storing the ARL label ID in a label database; and
an interface component sending, from the backup application, the ARL label ID during a backup session initiated by the backup server to automatically set a lock on all files processed by the backup session, wherein the lock conforms to the ARL period and COP period.

20. The system of claim 19 wherein the backup system comprises a Power Protect Data Domain File System deduplication backup system, and wherein the file is saved in a directory structure comprising an MTree, and further wherein the storage medium comprises local storage of the backup system.

* * * * *